United States Patent [19]

Kafura et al.

[11] 4,282,963
[45] Aug. 11, 1981

[54] BARRIER GUARD

[75] Inventors: Frederick G. Kafura; Thomas M. Medland, both of Appleton, Wis.

[73] Assignee: Hammermill Paper Company, Erie, Pa.

[21] Appl. No.: 35,785

[22] Filed: May 3, 1979

[51] Int. Cl.³ .............................................. F16P 3/08
[52] U.S. Cl. ....................................... 192/133; 74/612
[58] Field of Search ........................... 192/133; 74/612

[56] References Cited

U.S. PATENT DOCUMENTS

| 1,586,567 | 6/1926 | Mompere | 192/133 |
| 2,059,324 | 11/1936 | Emslie | 192/133 |
| 2,102,154 | 12/1937 | Hill | 192/133 X |

Primary Examiner—Allan D. Herrmann
Attorney, Agent, or Firm—Fitch, Even, Tabin, Flannery & Welsh

[57] ABSTRACT

A barrier guard for use with a winding machine or the like to prevent inadvertent access by the operator to a nip established between two cooperating rolls. The barrier guard includes first and second generally U-shaped guard bars, the second guard bar being pivotally connected to an elongated reach of the first guard bar which is adapted for pivotal connection to the machine frame for movement between an operating position wherein the guard bars prevent inadvertent access to the nip and a nonoperating position enabling operator access to the rolls for servicing and the like. A limit switch is mounted on the machine for actuation by the barrier guard so that operational rotation of the rolls is enabled only when the barrier guard is in its protective position.

8 Claims, 4 Drawing Figures

BARRIER GUARD

The present invention relates generally to the field of winding machines, and more particularly to a barrier guard for a winding machine.

In the papermaking and paper converting industries there are various types of machines or apparatus which rotate a shaft or central core at relatively high speed for the purpose of winding thereon a continuous web or sheet of material such as paper. One such apparatus, termed a rewinder, draws paper sheet material from a large supply roll and rolls the sheet onto a take-up support shaft to predetermined roll size which may then be removed from the cradle. The sheet material may be drawn through a plurality of slitters designed transversely of the sheet so as to cut the sheet into smaller width strips which are wound on the take-up or rewind shaft. One type of rewinder supports the take-up shaft on a cradle frame so that the sheet material passes between the winding roll and a drive roll which effects rotation of the take-up shaft and establishes a "running nip" or "nipping point" between the drawn sheet material and underlying winding roll. This poses a potentially serious hazard to an operator because in order to observe the take-up or rewind roll, it is generally necessary for the operator to stand in relatively close proximity to the rotating take-up roll and associated nip. The injury potential to the operator should he get his hands or clothing caught in the running nip is readily apparent.

The need for preventing or guarding against an operator placing one or both hands close to the take-up roll of a rewinder apparatus, and particularly close to a running nip, has been recognized by governmental bodies as evidenced by rules and regulations embodied in the Occupational Safety and Hazard Act which generally require that nipping points on all drum winders and rewinders which are on the operator's side of the apparatus be guarded by barrier guards interlocked with the drive mechanism so that the apparatus cannot be operated above jog speed without the guard in proper place.

It is highly desirable that any barrier guard for the aforementioned purpose be manually manipulatable to enable removal of the associated take-up roll when wound to desired size, as well as facilitating replacement with an empty take-up shaft or periodic maintenance of the apparatus. Furthermore, the barrier guard should allow the operator a substantially unobstructed view of the take-up roll during winding. Still further, any guard for this purpose should be adapted to accommodate different diameter rolls which may be wound on the rewinder.

A general object of the present invention is to provide a novel barrier guard which finds particular application in protecting the operator of a winding machine.

A more particular object of the present invention is to provide a novel barrier guard for use with a winding machine or the like, wherein the barrier guard is readily movable between a protective barrier position and an unobstructing position enabling access to the apparatus for loading, unloading and servicing, and wherein the barrier guard when in its protective position permits a substantially unobstructed view of the winding roll.

A feature of the barrier guard in accordance with the present invention lies in its relatively simple and inexpensive construction, and its ability to be adjusted for different size rolls without detracting from its intended purpose.

Further objects and advantages of the present invention, together with the organization and operation thereof, will become apparent from the following description when considered with the accompanying drawings, in which.

Figure 1:
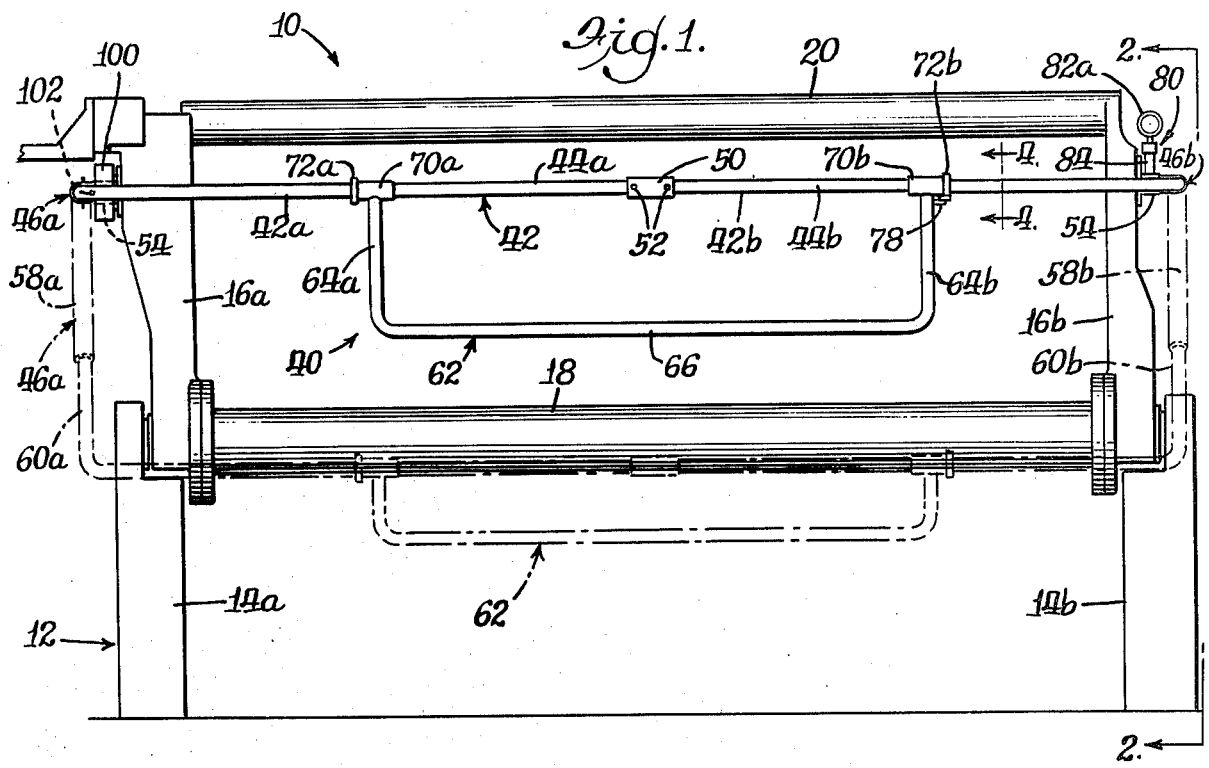
FIG. 1 is a fragmentary front elevational view of a winding machine employing a barrier guard constructed in accordance with the present invention, the barrier guard being shown in a protective position in solid lines, and in an unobstructing position in phantom lines.
Figure 2:
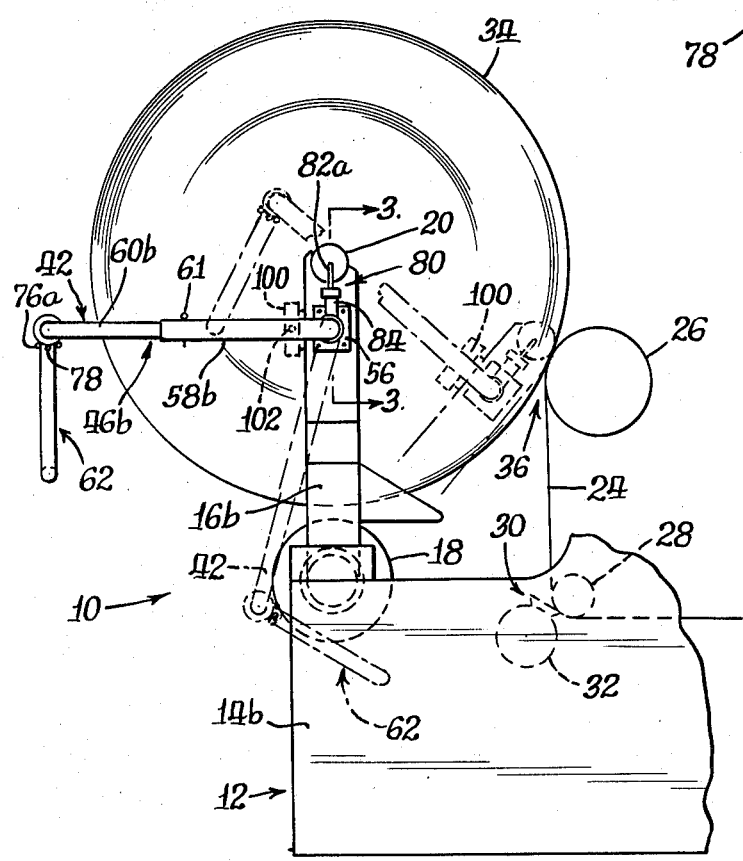
FIG. 2 is a fragmentary side elevational view taken substantially along line 2—2 of FIG. 1, the take-up shaft support cradle being shown in an empty condition in phantom and with a fully wound roll thereon in solid lines.

Referring now to the drawing, and in particular to FIGS. 1 and 2, the present invention is illustrated, by way of example, as being embodied in a rewinder machine or apparatus indicated generally at 10. The rewinder machine 10 is of known design and includes frame means 12 which includes a pair of laterally spaced upstanding supports 14a and 14b. The supports 14a, b support a cradle frame which includes laterally spaced parallel support arms 16a and 16b fixed radially on a cradle shaft 18 the opposite ends of which are pivotally supported on the supports 14a, b so that the cradle frame may pivot about the axis of shaft 18, as is known. The upper ends of the support arms 16a, b are adapted to releasably and rotatably support an elongated transverse take-up or rewind shaft 20 so that the opposite ends of the rewind shaft are journaled on the upper ends of the support arms.

With particular reference to FIG. 2, the rewinder machine 10 is conventionally employed to draw a web or sheet of paper or like material 24 from a supply roll (not shown) and roll the web onto a take-up or rewind shaft 20 supported on the cradle frame. To effect rotation of the take-up shaft 20 and sheet material being wound thereon, a transverse drive roll 26 is supported by the frame means 12 so that its axis lies generally on the pivotal path traversed by the axis of take-up shaft 20 as the cradle frame pivots about the cradle shaft 18 during a winding operation. To effect rewind, the end of the sheet or web 24 is suitably secured to the take-up shaft and the cradle frame is pivoted to a rear pivotal position, as shown in phantom in FIG. 2, wherein the drive roll 26 engages the web material against the underlying take-up shaft and is rotationally driven to wind the web onto the take-up shaft. The drive roll 26 is rotationally driven by conventional means to effect substantially constant speed of the web material from the supply roll.

As the paper web or sheet 24 passes to the take-up shaft 20, it passes under an idler or guide roll 28 of a slitter station 30 during which the sheet material may be slit longitudinally by one or more transversely spaced slitters 32 so as to form two or more substantially continuous strips of material of smaller lateral width than the sheet drawn from the supply roll. The slit strips pass from the slitter station 30 to rewind shaft 20 for winding thereon such as indicated by the wound roll 34. Alternatively, alternate ones of the slit strips may be wound on a first rewind or take-up shaft, such as rewind shaft 20, while the intermediate strips are wound on a second transverse rewind shaft (not shown) spaced from rewind shaft 20 and supported in a similar manner.

In the illustrated embodiment, as the rewind or take-up shaft 20 is rotationally driven in a counterclockwise direction, as considered in FIG. 2, by the drive roll 26, the drive roll establishes with the winding roll of material a running nip or nipping point, indicated generally at 36, which may be simply termed a nip and through which the sheet 24 is drawn. The nip so established is normally accessible by the operator so that the operator's fingers or clothing might be accidentally inserted into the nip with resultant possible injury to the operator.

In accordance with the present invention, a barrier guard, indicated generally at 40, is operatively associated with the rewinder machine 10 and is operative when disposed in a first operating or protecting position, as indicated in solid lines in FIGS. 1 and 2, to substantially prevent an operator from accidentally inserting his hands or otherwise catching a piece of clothing or the like in the nip 36. As will become more apparent hereinbelow, the barrier guard 40 is adapted for movement to a nonprotecting position, as shown in phantom in FIGS. 1 and 2, to enable access to the wound roll 34 and associated rewind shaft 20 for removal of the wound roll to another area and replacement with an empty rewind shaft on the support arms 16a, b, or for general maintenance and servicing of the rewinding machine. In accordance with an important feature of the invention, the barrier guard 40 has operative association with the rotational drive means, (not shown) for the drive roll 26 so as to prevent driving rotation of the rewind shaft at normal operating speeds unless the barrier guard is in its raised protective position. The drive means for the drive roll 26 is not totally disabled by movement of the barrier guard to its nonprotecting position so that the rewind shaft 20 may be jogged during initial connection of sheet material thereto as during initial setup.

The barrier guard 40 includes a first generally U-shaped guard bar 42 made of a suitable metallic tubular material and preferably comprising a pair of substantially identical L-shaped portions 42a and 42b, each of which includes connected arms 44a, 46a and 44b, 46b, respectively. In the illustrated embodiment, the arms 44a, 44b are releasably connected in axial alignment through a sleeve coupling 50 and transverse pins 52 so as to establish a horizontally extending bar parallel to the axis of the rewind shaft 20. The connected arms 44a, b have sufficient longitudinal length so that the associated arms 46a, b are spaced apart a distance slightly greater than the distance between the outer surfaces of the cradle support arms 16a, b, as best seen in FIG. 1.

The arms 46a, b of the guard bar 42 are coplanar and are pivotally connected at their outer ends to the corresponding cradle support arms 16a, b generally adjacent the axis of the rewind shaft 20. For this purpose, the outer ends of the guard bar arms 46a, b are curved or bent at 90° angles so as to be directed toward each other in axial alignment and form tubular pivot ends, such as indicated at 46c in FIG. 3. Each pivot end 46c is pivotally received and supported within an annular collar 54 secured in normal relation to a mounting plate 56 which is fixed to the outer surface of the corresponding cradle support arm 16a, b so as to allow pivotal movement of the guard bar 42 about the axis of the support collars 54.

The arms 46a, b of the guard bar 42 are longitudinally adjustable in length so as to enable selective positioning of the connected horizontal arm portions 44a, b radially outwardly from the rewind shaft 20 a distance sufficient to provide clearance for the anticipated maximum radius of a wound roll 34 on the rewind shaft. To this end, each of the arms 46a, b includes a first outer tubular portion 58a, b, respectively, which is formed integral with the corresponding pivot end 46c and is of suitable diameter to receive an arm portion 60a, b, respectively, in telescoping relation therein, the arm portions 60a, b being preferably formed integral with corresponding arm segments 44a, b. Releasable stop means, such as a release pin 61, is inserted through axially aligned pairs of openings in the telescoping arm portions 58a, 60a and 58b, 60b to maintain the arms 46a, b in preselected lengths, it being understood that a plurality of openings are provided along the lengths of the arm portions 60a, b to accommodate length adjustment.

The barrier guard 40 includes a second U-shaped guard bar 62 which is pivotally connected to the horizontal reach 44a, b of the guard bar 42 in a manner to enable limited pivotal movement of the guard bar 62 about the axis of the horizontal reach 44a, b. The guard bar 62 may also be made of metallic tubing and includes coplanar parallel arm portions 64a, b which are preferably formed integral with a straight length portion 66 and have axially aligned cylindrical tubular sleeves 70a and 70b mounted in normal relation to their free ends. The tubular sleeves 70a, b are pivotally mounted on the horizontal reach 44a, b of the guard bar 42 and are captured between annular collars 72a and 72b fixed on the arms 44a, b, respectively. In the illustrated embodiment, the arm portions 64a, b of the guard bar 62 are spaced apart a distance less than the distance between the cradle support arms 16a, b, although alternate spacing of the arm portions 64a, b may be desired.

Figure 4:
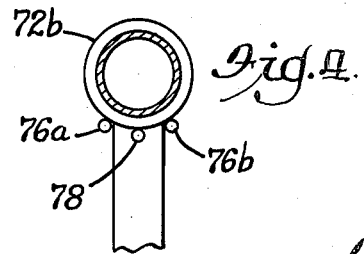
FIG. 4 is a fragmentary transverse sectional view, on an enlarged scale, taken substantially along line 4—4 of FIG. 1.

As best seen in FIG. 4, the collar 72b has a pair of parallel stop pins 76a and 76b secured on its peripheral surface so that the axis of stop pins are parallel to the axis of the collar and are angularly spaced apart by an included angle of approximately 60° relative to the axis of the collar. The collar 72b is fixed on arm 44b so that planes containing the axis of the collar 72a and the axes of pins 76a, b subtend an angle of approximately 30° with vertical when the guard bar 42 is positioned in a protecting position lying in a substantially horizontal plane, as shown in solid lines in FIG. 2. A similar stop pin 78 is fixed in normal relation to the arm 64b of guard bar 62 in a manner to cooperate with the stop pins 76a, b and limit the extent of pivotal movement of guard bar 62 about the axis of the horizontal reach 44a, b of the guard bar 42.

Figure 3:
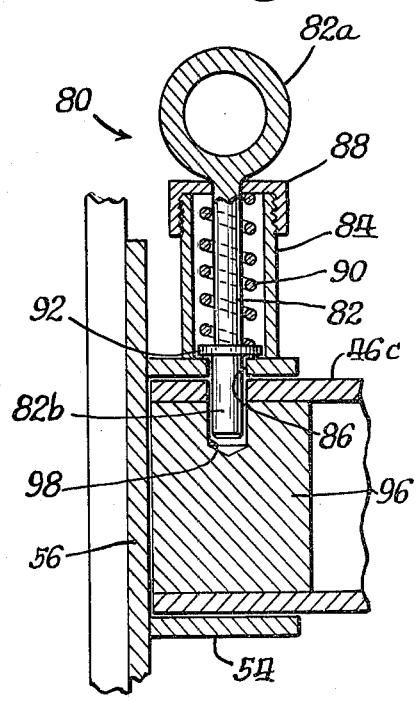
FIG. 3 is a fragmentary sectional view, on an enlarged scale, of the releasable locking mechanism for the barrier guard, taken substantially along line 3—3 of FIG. 2.

To maintain the guard bar 42 in a protecting operating position wherein it lies in a plane substantially normal to the cradle support arms 16a, b, lock means, indicated generally at 80, are operatively associated with the cradle frame and the guard bar 42 so as to releasably maintain the first guard bar in its upper protecting position. In the illustrated embodiment, and as best seen in FIG. 3, the lock means 80 includes a locking pin 82 which is supported by and within a tubular sleeve 84 fixed on the annular collar 54 as by welding so as to axially overlie an opening 86 in the collar. A cap 88 is mounted on the outer end of sleeve 84 and has a center opening through which the shank of locking pin 82 extends so that a finger grip end 82a of the locking pin is readily accessible. The locking pin 82 is biased radially inwardly relative to collar 54 by a coil compression spring 90 which acts between the cap 88 and an annular stop ring 92 fixed on the locking pin.

The end 46c of guard bar arm 46b has a plug 96 secured therein which has a radial blind bore 98 positioned to receive a lower end 82b of the locking pin 82 when the guard bar 42 is positioned to lie in a plane substantially normal to the cradle arms 16a, b. Withdrawal of the locking pin 82 from the bore 98 allows the guard bars 42 and 62 to be swung downwardly about the pivot axis of the guard bar 42, as shown in phantom in FIG. 2, while the guard bar 62 also swings slightly downwardly relative to guard bar 42 to clear the cradle shaft 18.

In accordance with an important feature of the invention, proximity limit switch means in the form of a limit switch 100 is mounted on the cradle support arm 16a and is adapted to be actuated by the arm 46a of guard bar 42 when disposed in its protecting operating position normal to the cradle support arms 16a, b. The limit switch 100 is of conventional design and has a depressible control button or knob thereon, such as indicated at 102 in FIG. 2, which is depressed by the arm 46a when in its operative protecting position. The proximity switch 100 is connected in circuit with the drive control means (not shown) for drive roll 26 so that when the barrier guard 40 is in its lowered nonprotecting position, the drive roll cannot be driven at its normal operating speed. However, as aforementioned, the control for the drive roll 26 is adapted to enable jogging rotation of the drive roll and thus the rewind shaft 20 when the barrier guard 40 is in its lowered nonprotecting position so as to enable initial connection or winding of sheet material onto the rewind shaft. The control means and associated control circuit for the drive roll 26 may be of substantially any known design and need not be described in detail herein.

Briefly reviewing the operation of the barrier guard 40 and its operative relation with the rewinder machine 10, the barrier guard may be positioned in its lowered nonprotecting position during initial connection of one or more sheets or strips of material 26 to the rewind shaft 20 to initiate winding of the sheet material onto the rewind shaft. With the barrier guard in its lowered position, the proximity limit switch 100 is conditioned to prevent energizing of the drive roll 26 to effect rotation of the take-up or rewind shaft 20 at its normal operating speed. The control means for the drive roll 26 will, however, allow jogging rotation of the rewind shaft as necessary to initiate winding of the sheet material thereon.

After initially connecting the sheet material 26 to the rewind shaft 20, the guard bar 42 is raised to its upper protecting position wherein it lies in a plane generally normal to the cradle arms 16a, b and the locking pin 82 is biased into the bore 98 in arm 46c to maintain the guard bar 42 in its raised operative position. With the guard bar 42 in its raised position and the cradle frame in a rearward position as shown fragmentarily in phantom in FIG. 2, the guard bar 62 hangs downwardly from the reach 44a, b of bar 42 with the stop pin 78 engaging the stop pin 76b. In this manner, the operator is prevented from accidentally or inadvertently reaching for the winding roll and, particularly, inserting his fingers or clothing into the nip 36 which could result in injury to the operator. As noted, with the guard bars 42 and 62 in their upper protecting position, the guard bar 62 is prevented from pivoting relative to the horizontal reach 44a, b of guard bar 42 beyond an angle of approximately 30° either side of a plane normal to the plane of guard bar 42 and intersecting arm portions 44a, b.

Upon termination of a winding operation, the locking pin 82 may be released from the leg 46c of guard bar 42 to allow downward pivotal movement of the guard bars 42 and 62 during which the guard bar 62 is allowed to pivot relative to guard bar 42 to enable clearance below the cradle shaft 18.

Thus, in accordance with the present invention, a barrier guard is provided which prevents an operator standing in close proximity to a rewinding machine from accidentally engaging the winding roll or from accidentally inserting his hand into a nip between the winding roll and an associated drive roll. The barrier guard allows substantially unobstructed visibility of the rewind apparatus and associated roll being wound thereon. The barrier guard is adapted to adjustment to accommodate varying size rolls and may be readily moved between an operating protecting position and a non-operating position providing unobstructed access to the rewind shaft and associated wound roll. The associated proximity switch 100 in cooperation with the barrier guard prevents driving rotation of the rewind shaft, except in a jogging mode, unless the barrier guard is in its proper protecting position.

While a preferred embodiment of the present invention has been illustrated and described, it will be understood that changes and modifications may be made therein without departing from the invention in its broader aspects. Various features of the invention are defined in the following claims.

What is claimed is:

1. A barrier guard for use with apparatus which includes frame means rotatably supporting a pair of elongated rolls so that said rolls establish a nip therebetween accessible to an operator, said barrier guard comprising a first generally U-shaped guard bar having parallel substantially coplanar arm portions interconnected by an elongated reach, said arm portions being axially adjustable in length and adapted for pivotal connection to said frame means so that said elongated reach is substantially parallel to said rolls and is spaced therefrom, and a second generally U-shaped guard bar having parallel arm portions interconnected by an elongated reach, said arm portions of said second guard bar being pivotally mounted on said elongated reach of said first guard bar so that said elongated reach of said second guard bar is spaced from said reach of said first guard bar, and means operatively associated with said first and second guard bars for limiting the extent of relative pivotal movement of said second guard bar relative to said first guard bar.

2. A barrier guard as defined in claim 1 wherein said arm portions of said first guard bar include means enabling releasable locking of said first guard bar in predetermined relation to said frame means when connected thereto.

3. In apparatus for winding sheet material or the like onto a take-up shaft, said apparatus including a drive roll and cradle frame means supporting said take-up shaft in generally parallel relation to the drive roll such that the material being wound is engaged by the drive roll so as to define a nip accessible to the operator, the combination therewith comprising a barrier guard having a first generally U-shaped guard bar having substantially parallel laterally spaced arm portions which are pivotally connected to said cradle means so as to define an elongated reach of said first guard bar disposed substantially parallel to the axis of said take-up shaft and spaced therefrom so as to enable winding of sheet material on said take-up shaft, a second guard bar pivotally connected to said elongated reach of said first guard bar and defining an elongated reach substantially parallel to said elongated reach of said first guard bar, said first guard bar being movable about the axis of its pivotal connection to said cradle frame means between an operating position wherein the elongated reaches of said guard bars are disposed in juxtaposed relation to the roll of material being wound on said take-up shaft and said second guard bar hangs downwardly from said reach of said first guard bar so as to cooperate therewith to substantially prevent accidental access by an operator to said nip during rotation of said take-up shaft, and a nonoperating position wherein said guard bars are spaced from said nip enabling operator access to the take-up shaft and associated wound material thereon, and locking means operatively associated with said cradle frame means and said first guard bar for releasably locking said first guard bar in its said operating position, said laterally spaced arm portions of said first guard bar being axially extendable to enable selective spacing of said elongated reaches of said first and second guard bars from the axis of said take-up shaft so as to accommodate different diameter material rolls wound thereon.

4. The combination as defined in claim 1 including means operatively associated with said first and second guard bars for limiting the extent of pivotal movement of said second guide bar relative to said first guide bar.

5. The combination as defined in claim 4 wherein said cradle frame means includes a pair of laterally spaced support arms, said laterally spaced arm portions of said first guard bar being coplanar and each being pivotally connected at its free end to an opposite one of said cradle support arms, said locking means being adapted to releasably lock said first guard bar in a position lying in a plane substantially normal to said cradle support arms.

6. The combination as defined in claim 1 wherein said locking means includes a spring-loaded locking pin supported by said cradle frame means for cooperation with said first guard bar so as to releasably retain said first guard bar in its said operating position, said locking pin being releasable from said first guard to enable pivotal movement of said first guard bar to its said nonoperating position.

7. The combination as defined in claim 1 wherein drive roll is adapted to be rotatably driven so as to effect rotation of said take-up shaft in a direction to wind sheet material thereon, and means including limit switch means operatively associated with said barrier guard and said drive roll and adapted to prevent rotation of said drive roll at its normal operating speed when said first guard bar is in its said non-operating position.

8. The combination as defined in claim 7 wherein said cradle frame means includes a pair of laterally spaced support arms, said parallel arm portions of said first guard bar each being pivotally mounted on an opposite one of said cradle support arms, said limit switch means including a limit switch supported on one of said cradle support arms for operative association with an associated one of said arm portions of said first guard bar and being adapted to enable driving rotation of said drive roll only when said first guard bar is in its said operating position.

* * * * *

UNITED STATES PATENT AND TRADEMARK OFFICE
CERTIFICATE OF CORRECTION

PATENT NO. : 4,282,963

DATED : August 11, 1981

INVENTOR(S) : Fredrick G. Kafura and Thomas M. Medland

It is certified that error appears in the above—identified patent and that said Letters Patent is hereby corrected as shown below:

Column 6, line 22, change "to" (first usage) to --for--;

Column 7, Claim 4, line 1, change "1" to --3--;

Column 8, Claim 6, line 1, change "1" to --3--;

Column 8, Claim 7, line 1, change "1" to --3--.

Signed and Sealed this

Fifteenth Day of December 1981

|SEAL|

Attest:

Attesting Officer

GERALD J. MOSSINGHOFF

Commissioner of Patents and Trademarks